United States Patent [19]

Blinne et al.

[11] 4,065,437
[45] Dec. 27, 1977

[54] AROMATIC POLYETHER-SULFONES

[75] Inventors: Gerd Blinne, Freinsheim; Claus Cordes, Weisenheim, both of Germany

[73] Assignee: BASF Aktiengesellschaft, Ludwigshafen, Germany

[21] Appl. No.: 731,127

[22] Filed: Oct. 12, 1976

[30] Foreign Application Priority Data

Nov. 5, 1975 Germany .............................. 2549529

[51] Int. Cl.² .......................... C08G 2/18; C08G 8/02; C08G 63/66; C08G 65/40
[52] U.S. Cl. ................................. 260/49; 260/30.8 R; 260/30.8 DS; 260/50; 260/591; 560/11
[58] Field of Search .................... 260/49, 47 R, 50, 61, 260/30.8 R, 30.8 DS

[56] References Cited

U.S. PATENT DOCUMENTS

| | | | |
|---|---|---|---|
| 3,647,751 | 3/1972 | Darsow et al. | 260/49 |
| 3,840,580 | 10/1974 | Feasey et al. | 260/463 |
| 3,886,120 | 5/1975 | Yagi et al. | 260/49 |
| 3,886,121 | 5/1975 | Yagi et al. | 260/49 |
| 3,928,295 | 12/1975 | Rose | 260/79.3 M |

*Primary Examiner*—Lester L. Lee
*Attorney, Agent, or Firm*—Keil, Thompson & Shurtleff

[57] ABSTRACT

New thermoplastic polymers based on aromatic polyether-sulfones, which have molecular weights of from about 15,000 to 35,000 and contain units of the formula

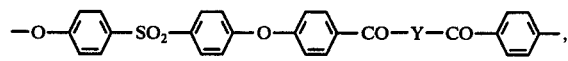

where Y is 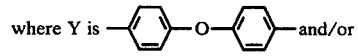 and/or

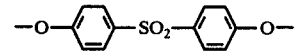

and a process for their manufacture.

7 Claims, No Drawings

AROMATIC POLYETHER-SULFONES

Aromatic polyether-sulfones which exhibit good heat resistance have been disclosed and are described, for example, in German Published Application No. 1,520,131. The products are manufactured either by a Friedel Crafts condensation of aryl-sulfonyl halides with an aromatic compound, with elimination of halohydrocarbons, by condensation of di-alkali metal salts of a diphenol with an aromatic dihalogen compund or by condensation of the alkali metal salt of a halophenol, with elimination of an alkali metal halide.

Polyether-sulfones which contain carbonyl groups and/or ester groups in the polymer chain have also been disclosed. Such polymers are described, for example, in British Pat. Nos. 971,227, 1,086,021 and 1,153,527 and in German Laid-Open application No. 2,425,199. Some of the polymers exhibit relatively good heat resistance and a degree of resistance to certain chemicals. It is a disadvantage of the above processes, and of the polymers manufactured by the said processes, that the polyethersulfones obtained have low molecular weights, because of the low reactivity of the starting monomers, and therefore have unsatisfactory mechanical properties or are partially crosslinked.

On the other hand, monomers such as those mentioned, for example, in German Laid-Open application No. 2,425,199 give polymers having a high melt viscosity, which are therefore difficult to process.

It is an object of the present invention to manufacture, from novel monomers which may be obtained simply and inexpensively, high quality polyether-sulfones, containing ester groups and/or carbonyl groups, which have a satisfactory molecular weight, are easily processable and give moldings, films and the like which possess good mechanical properties and good chemical resistance.

We have found that this object is achieved by providing aromatic polyether-sulfones, containing ester groups and/or carbonyl groups, which comprise from 20 to 250, preferably from 25 to 40, units of the formula (I)

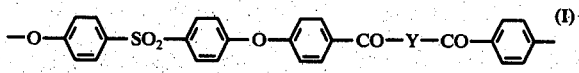 (I)

where Y is a divalent aromatic radical of the formula (II) and/or (III)

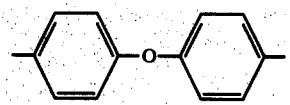 (II)

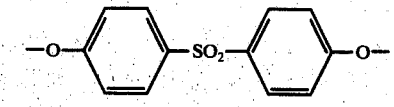 (III)

which polyether-sulfones have the excellent properties referred to above.

The terminal groups in the polyether-sulfones of the invention are preferably hydroxyl, alkoxy of 1 to 5 carbon atoms and halogen, e.g. fluorine and chlorine, but particularly chlorine and/or methoxy.

Particularly excellent properties are exhibited by an aromatic polyether-sulfone containing ester groups and/or carbonyl groups which consists exclusively of units of the formula (I) and in which the terminal groups are predominantly chlorine and/or methoxy.

The polyether-sulfones of the invention are obtained by condensing a di-(alkali metal) salt of bis-(4-hydroxyphenyl)-sulfone, preferably the disodium salt and especially the dipotassium salt, with compounds of the formula (IV)

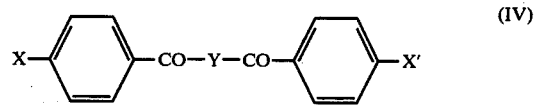 (IV)

where Y is a divalent aromatic radical of the above formula (II) and/or (III), and X and X' are identical or different and each is a radical which is nucleophilically replaceable, preferably Cl and/or F.

Preferred compounds of the formula (IV) are reaction products of 2 moles of p-chlorobenzoyl chloride, with one mole of diphenyl ether or bis-(4-hydroxyphenyl)-sulfone. Appropriate products have the formulae (V) and (VI)

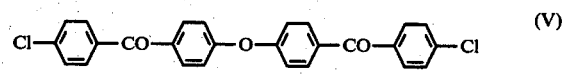 (V)

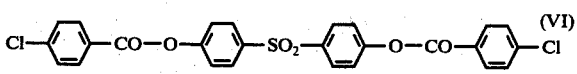 (VI)

The products of the formula (V) and (VI) may be used individually or as mixtures. In mixtures, the ratios may vary within wide limits; for example, the molar ratio may be from 99 : 1 to 1 : 99. Mixtures of (V) with (VI) in the molar ratio of from 20 : 80 to 80 : 20 have proved particularly suitable.

To manufacture the polyether-sulfones of the invention, a di-(alkali metal salt) of bis-(4-hydroxyphenyl)-sulfone and the compounds of the formula (IV) are condensed in the molar ratio of from 0.9 to 1.1 : 1, preferably from 0.95 to 1.05 : 1 and especially about 1 : 1.

The condensation is carried out at from 150° C to below the decomposition temperature of the reactants, preferably at from 150° to 350° C, especially from 200° to 350° C, in anhydrous media. Preferably, the condensation is carried out in the presence of polar aprotic solvents, e.g. dimethylformamide, N-methylpyrrolidone and particularly dimethylsulfoxide and 1,1-dioxotetrahydrothiophene (sulfolan). If solvents are used, their amounts are advantageously such that polyethersulfone solutions having a solids content of from 20 to 70% by weight, preferably from 40 to 60% by weight and especially of about 50% by weight, are formed. If desired, the polyethersulfones of the invention can also be manufactured by continued polycondensation of oligomers, manufactured in accordance with the process described above, in a second reaction step in the absence of solvents, i.e. in the melt. Appropriate oligomers have molecular weights of, for example, from 1,000 to 15,000, preferably from 5,000 to 10,000.

Halohydrocarbons, e.g. methyl chloride, have proved suitable molecular weight regulators. The phenolate end groups of the bis-(4-hydroxyphenyl)-sulfone, present in the condensation mixture, are converted to alkoxy groups by adding the halohydrocarbons after the desired molecular weight has been reached. This prevents further condensation.

The polyether-sulfones of the invention are preferably manufactured as follows: the potassium bis-(4-hydroxyphenyl)-sulfone, which can be obtained by conventional methods from potassium hydroxide and bis-(4-hydroxyphenyl)-sulfone, is condensed with about an equimolar amount of a compound of the formula IV or of a mixture of the products of the formulae V and VI at above 150° C, preferably at from 200° to 350° C, in the presence of an aprotic solvent.

When the desired molecular weight has been reached, the polycondensation is discontinued by adding methyl chloride. The salt formed in the polycondensation is separated from the polymer, preferably by filtration or extraction. The aromatic polyether-sulfone, containing ester groups and/or carbonyl groups, can be further processed directly, as the solution, to give fibers, films, coatings and laminates. However, it can also be converted to a solid by precipitation, preferably by means of water and/or low molecular weight alcohols, e.g. methanol, isopropanol and the like, followed by drying, and the solid can be processed to give shaped articles by compression molding, extrusion or injection molding.

The polyether-sulfones of the invention, which have a heat distortion point of not less than 180° C, and have molecular weights of from about 15,000 to 35,000 (corresponding to inherent viscosities of from about 0.4 to 0.65 in 1% strength solution in N-methylpyrrolidone), are preferably used for the manufacture of films for the electrical industry and moldings for electrical equipment, household equipment and automobiles.

The Examples which follow illustrate the invention in more detail. Parts are by weight. The inherent viscosities $\eta_{inh}$ are measured at 24° C, being determined with the aid of the equation $$\eta_{inh} = \frac{\ln \eta_{rel}}{C}$$

The measurements were carried out in 1% strength solution in N-methylpyrrolidone.

MANUFACTURE OF THE STARTING MONOMERS 4,4'-Di-(p-chlorobenzoyl)-diphenyl ether (V)

175 parts of p-chlorobenzoyl chloride are added dropwise, in the course of 2 hours, to a solution of 87.5 parts of diphenyl ether and 3 parts of iron trichloride in 100 parts of nitrobenzene at room temperature, while stirring. The hydrogen chloride formed is expelled by a stream of nitrogen. As soon as the evolution of hydrogen chloride begins to subside, the reaction mixture is slowly heated to 100° C and condensation is carried out at this temperature until the reaction has ended (about 4 hours). Precipitation with methanol, and recrystallization from dimethylsulfoxide, gives 183 parts of 4,4'-di-(p-chlorobenzoyl)-diphenyl ether (of the formula V) having a melting point of 244° – 247° C.

4,4'-Bis-(p-chlorobenzoyl-oxyphenyl)-sulfone (VI)

70 parts of p-chlorobenzoyl chloride are added dropwise, in the course of 2 hours, to a solution of 50 parts of bis-(4-hydroxyphenyl)-sulfone in 300 parts of N-methylpyrrolidone at room temperature, while stirring. The reaction mixture is then slowly heated to 100° C and the condensation is carried out for one hour at this temperature. After cooling, the 4,4'-bis-(p-chlorobenzoyloxyphenyl)-sulfone is precipitated by means of water. 89 parts of the monomer (of the formula VI) having a melting point of 230° – 234° C are obtained.

EXAMPLE 1

250 parts of bis-(4-hydroxyphenyl)-sulfone are dissolved in 700 parts of 1,1-dioxotetrahydrothiophene and 1,500 parts of chlorobenzene and 112 parts of potassium hydroxide are added while stirring. The water formed is then distilled off azeotropically with chlorobenzene. The formation of the salt has ended when all the chlorobenzene has distilled over.

To carry out the polycondensation, 447 parts of 4,4'-di-(p-chlorobenzoyl)-diphenyl ether are added and the mixture is then slowly heated to 220° C in the course of 6 hours. It is then allowed to cool to about 40° C, a stream of methyl chloride is passed through the solution, and the product is precipitated with a mixture of methanol and water. After washing and drying, 600 parts of a polyether-sulfone which has an inherent viscosity $\eta_{inh}$ of 0.5 are obtained; the polyether-sulfone can be processed at from 320° to 340° C to give moldings which have a sustained-exposure heat distortion point of above 180° C.

EXAMPLE 2

The dipotassium salt of bis-(4-hydroxyphenyl)-sulfone is manufactured from 250 parts of bis-(4-hydroxyphenyl)-sulfone, by the method described in Example 1.

527 parts of 4,4'-bis-(p-chlorobenzoyl)-oxyphenyl)-sulfone are added to the resulting dipotassium salt of bis-(4-hydroxyphenyl)-sulfone, whilst stirring, the reaction mixture is slowly heated to 200° C, and the condensation is then carried out at this temperature for 24 hours. When the reaction mixture has cooled, a stream of methyl chloride is passed through it, and the polyether-sulfone is then precipitated by means of a mixture of methanol and water in the weight ratio of 1:1. After washing and drying, 660 parts of polyether-sulfone having an inherent viscosity $\eta_{inh}$ of 0.6 are obtained. The polycondensate can be processed to give films and moldings having a sustained-exposure heat distortion point of above 180° C. The processing temperature is about 320° C.

EXAMPLE 3

The dipotassium salt of bis-(4-hydroxyphenyl)-sulfone is manufactured from 250 parts of bis-(4-hydroxyphenyl)-sulfone, by the method described in Example 1.

223.5 parts of 4,4'-di-(p-chlorobenzoyl)-diphenyl ether and 263.5 parts of 4,4'-bis-(p-chlorobenzoyl-oxyphenyl)-sulfone are added to the dipotassium salt of bis-(4-hydroxyphenyl)-sulfone, whilst stirring, the reaction mixture is slowly heated to 200° C, and the condensation is then carried out at this temperature for 24 hours. When the reaction mixture has cooled, a stream of methyl chloride is passed through it, and the polyether-sulfone is then precipitated by means of a mixture of methanol and water in the weight ratio of 1:1. After washing and drying, 620 parts of polyether-sulfone having an inherent viscosity $\eta_{inh}$ of 0.55 are obtained. The polycondensate can be processed to give films and moldings having a sustained-exposure heat distortion point of above 180° C. The processing temperature is about 320° C.

We claim:
1. An aromatic polyethersulfone having repeating units of the formula (Ia)

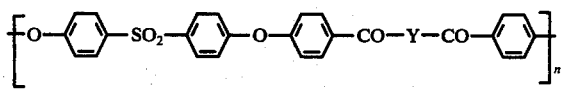

where Y is selected from the group consisting of

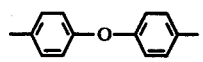

and

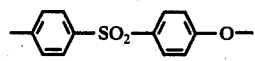

individual Y's being identical or different, $n$ is an integer of from 20 to 250, and the terminal groups being selected from the group consisting of hydroxy, alkoxy of 1 to 5 carbon atoms, F and Cl.

2. An aromatic polyethersulfone as claimed in claim 1, wherein the terminal groups are selected from the group consisting of methoxy and —Cl.

3. An aromatic polyethersulfone as claimed in claim 1, in which $n$ is 25 to 40.

4. An aromatic polyethersulfone as claimed in claim 1, wherein the repeating units consist exclusively of said units (Ia).

5. An aromatic polyethersulfone as claimed in claim 1, wherein the repeating units consist exclusively of said units (Ia), and said terminal groups are predominantly members selected from the group consisting of chlorine and methoxy.

6. A process for the preparation of an aromatic polyethersulfone as defined in claim 1, which comprises condensing a dialkali metal salt of di-(4-hydroxyphenyl)-sulfone with a compound selected from the group consisting of

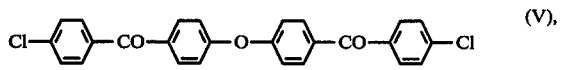

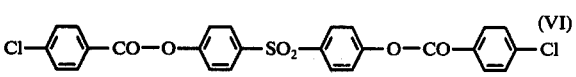

in a molar ratio of from 0.9 to 1.1:1 at a temperature of from 200° to 350° C.

7. A process as claimed in claim 6, wherein the condensation is carried out in presence of such an amount of a polar aprotic solvent selected from the group consisting of dimethylsulfoxide and sulfolane in an amount such that a polyethersulfone solution having a solids content of 20% to 70% by weight is formed.

* * * * *